(12) United States Patent
Fu et al.

(10) Patent No.: US 12,506,565 B2
(45) Date of Patent: Dec. 23, 2025

(54) TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/145,973

(22) Filed: Dec. 23, 2022

(65) Prior Publication Data

US 2023/0254071 A1 Aug. 10, 2023

Related U.S. Application Data

(63) Continuation of application No. PCT/CN2020/124072, filed on Oct. 27, 2020.

(51) Int. Cl.
*H04L 1/1822* (2023.01)
*H04L 5/00* (2006.01)
*H04W 72/56* (2023.01)

(52) U.S. Cl.
CPC .......... *H04L 1/1822* (2013.01); *H04L 5/0055* (2013.01); *H04W 72/56* (2023.01)

(58) Field of Classification Search
CPC ....... H04L 1/1822; H04L 5/005; H04W 72/56
See application file for complete search history.

(56) References Cited

U.S. PATENT DOCUMENTS

| 10,531,292 | B2 | 1/2020 | Ben Henda et al. | |
| 10,536,849 | B2 | 1/2020 | Ben Henda et al. | |
| 2017/0150523 | A1* | 5/2017 | Patel | H04W 74/085 |
| 2018/0368175 | A1* | 12/2018 | Jeon | H04W 72/04 |
| 2019/0141523 | A1 | 5/2019 | Ben Henda et al. | |
| 2019/0141584 | A1 | 5/2019 | Ben Henda et al. | |
| 2020/0120497 | A1 | 4/2020 | Ben Henda et al. | |
| 2020/0120498 | A1 | 4/2020 | Ben Henda et al. | |

(Continued)

FOREIGN PATENT DOCUMENTS

| CN | 109644339 A | 4/2019 |
| CN | 111181693 A | 5/2020 |

(Continued)

OTHER PUBLICATIONS

Qualcomm Inc. "New WID on NR-based Access to Unlicensed Spectrum" 3GPP TSG RAN Meeting #82 RP-182878, Sorrento, Italy, Dec. 10-13, 2018, (revision of RP-182806). 8 pages.

(Continued)

*Primary Examiner* — Albert Decady
*Assistant Examiner* — Osman M Alshack
(74) *Attorney, Agent, or Firm* — PERKINS COIE LLP

(57) ABSTRACT

A transmission method and a terminal device are provided. The transmission method includes: when configuring a configured grant retransmission timer, a terminal device determining a hybrid automatic repeat request process and/ or the state of the timer on the basis of a satisfied condition. By means of the embodiments of the present application, the transmission delay of a resource, especially a low-priority resource, can be reduced.

18 Claims, 10 Drawing Sheets

(56) References Cited

U.S. PATENT DOCUMENTS

| | | | |
|---|---|---|---|
| 2020/0314658 A1* | 10/2020 | Bergström | H04W 72/21 |
| 2020/0351832 A1* | 11/2020 | Baek | H04L 1/1822 |
| 2020/0374815 A1* | 11/2020 | Bi | H04W 52/30 |
| 2020/0396024 A1* | 12/2020 | Ganesan | H04L 1/1819 |
| 2021/0105096 A1* | 4/2021 | Chin | H04L 1/1887 |
| 2021/0105812 A1* | 4/2021 | Rastegardoost | H04L 1/1671 |
| 2021/0144743 A1* | 5/2021 | Rastegardoost | H04W 72/23 |
| 2021/0307057 A1* | 9/2021 | Baek | H04W 76/27 |
| 2021/0392662 A1* | 12/2021 | Fu | H04W 72/1263 |
| 2021/0410180 A1* | 12/2021 | Tsai | H04L 1/1819 |
| 2022/0183049 A1* | 6/2022 | Lee | H04W 72/569 |

FOREIGN PATENT DOCUMENTS

| | | |
|---|---|---|
| CN | 111277371 A | 6/2020 |
| WO | 2020193638 A1 | 10/2020 |
| WO | 2020200251 A1 | 10/2020 |

OTHER PUBLICATIONS

Nokia et al. "Corrections for NR operating with shared spectrum channel access" 3GPP TSG-RAN WG2 Meeting #111 Electronic R2-2008650, Elbonia, Aug. 17-28, 2020. 25 pages.

International Search Report in the international application No. PCT/CN2020/124072, mailed on Jul. 22, 2021. 9 pages with English translation.

Written Opinion of the International Search Authority in the international application No. PCT/CN2020/124072, mailed on Jul. 22, 2021. 11 pages with English translation.

OPPO: "Remaining issues on NR-U configured grant", 3GPP Draft; R2-2000417, 3rd Generation Partnership Project (3GPP), Mobilecompetence Centre ; 650, Route Des Lucioles ; F-06921 Sophia-Antipolis Cedex; France vol. RAN WG2, No. electronic; 2020030617 Feb. 2020 (Feb. 17, 2020), XP052355591, the whole document, 4 pages.

CMCCC: "Discussion on CG harmonization for URLLC in unlicensed controlled", 3GPP Draft; R2-2010374, BRD Generation Partnership Project (3GPP), Mobilecompetence Centre ; 650, Route Des Lucioles ; F-06921 Sophia-Antipolis Cedex; France vol. RAN WG2, No. Online;20201102-2020111323 Oct. 2020 (Oct. 23, 2020), XP052363413, the whole document, 3 pages.

Fujitsu: "On PDU overwritten in NR-U configured grant", 3GPP Draft; R2-1913163 On PDU Overnrittenin NR-U Configured Grant, 3rd Generation Partnership Projectt (3GPP), Mobile Competence Centre ; 650, Route Des LucIOLES ; E-06921 Sophia-Antipolis Cedex; FRA vol. RAN WG2, No. Chongqing, China; 20191014-201910184 Oct. 2019 (Oct. 4, 2019), XP051804870, the whole document, 5 pages.

ZTE Corporation et al: "Discussion on configured grant for NR-U", 3GPP Draft; R2-1913373_Discussion on Conf igured Grant for NR-U, 3rd Generation Partnership Project (3GPP), Mobilecompetence Centre ; 650, Route Des Lucioles ; F-06921 Sophia-Antipolis Cedex; France vol. RAN WG2, No. Chongqing, China; 2019 1014 -201910183 Oct. 2019 (Oct. 3, 2019), XP051804240, the whole document, 4 pages.

Supplementary European Search Report in the European application No. 20959000.9, mailed on Nov. 28, 2023, 11 pages.

First Office Action of the European application No. 20959000.9, issued on Sep. 4, 2024, 4 pages.

"3rd Generation Partnership Project; Technical Specification Group Radio Access Network; NR; Radio Resource Control (RRC) protocol specification (Release 16)", 3GPP TS 38.331 V16.2.0 (Sep. 2020), pp. 380-386.

* cited by examiner

200

A terminal device determines a state of a Hybrid Automatic Repeat Request (HARQ) process and/or a timer based on a satisfied condition in a case of configuring a CG retx Timer — S210

| A terminal device starts a Configured Grant (CG) timer and/or a CG retx Timer at a first time, the first time comprising at least one of following: an end of a last symbol of a resource, and after the end of last symbol of the resource | — S310 |

FIG. 3

TRANSMISSION METHOD AND TERMINAL DEVICE

CROSS-REFERENCE TO RELATED APPLICATION

The present disclosure is a US continuation application of International Application No. PCT/CN2020/124072, filed on Oct. 27, 2020. The disclosure of the above application is hereby incorporated by reference in its entirety.

BACKGROUND

In 5th-Generation (5G) Radio Access Network (RAN)2 Ultra-Reliable and Low Latency Communication (URLLC), it is necessary to support the transmission of Factory automation, Transport Industry, Electrical Power Distribution and other services in 5G systems. In order to support the transmission of URLLC services, the Configured Grant (CG) is enhanced. That is, multiple CG configurations are introduced, and the specific configuration and use (such as supporting slot-level period, supporting automatic transmission of CG, etc.) of CG are enhanced.

SUMMARY

The present disclosure relates to the field of communication, and in particular to a method for transmission and a terminal device.

The embodiments of the present disclosure provide a method for transmission and a terminal device, which can reduce the latency of resource transmission.

The embodiments of the present disclosure provide a method for transmission. The method includes the following operation.

The terminal device determines a state of a Hybrid Automatic Repeat Request (HARQ) process and/or a timer based on a satisfied condition in a case of configuring a Configured Grant (CG)-Retransmission Timer (CG retx Timer).

The embodiments of the present disclosure provide a method for transmission.

The terminal device starts a CG timer and/or the CG-Retransmission Timer (CG retx Timer) at a first time. The first time includes at least one of following: an end of a last symbol of a resource, and after the end of the last symbol of the resource.

The embodiments of the present disclosure provide a terminal device. The terminal device includes a processing unit, which is configured to determine a state of a Hybrid Automatic Repeat Request (HARQ) process and/or a timer based on a satisfied condition in a case of configuring a Configured Grant (CG)-Retransmission Timer (CG retx Timer).

The embodiments of the present disclosure provide a terminal device. The terminal device includes a processing unit, which is configured to start a Configured Grant (CG) timer and/or a CG-Retransmission Timer (CG retx Timer) at a first time. The first time comprises at least one of following: a last symbol of a resource and a time after the last symbol of the resource.

The embodiments of the present disclosure provide a terminal device. The terminal device includes a processor and a memory. The memory is configured to store a computer program, and the processor is configured to invoke and run the computer program stored in the memory to cause the terminal device to perform above method for transmission.

The embodiments of the present disclosure provide a network device. The network device includes a processor and a memory. The memory is configured to store a computer program, and the processor is configured to invoke and run the computer program stored in the memory to cause the network device to perform above method for transmission.

The embodiments of the present disclosure provide a chip for implementing above method for transmission.

Specifically, the chip includes a processor. The processor is configured to invoke and run a computer program from a memory to cause a device on which the chip is mounted to perform above method for transmission.

The embodiments of the present disclosure provide a computer-readable storage medium for storing a computer program. When the computer program is run by a device, the device performs above method for transmission.

The embodiments of the present disclosure provide a computer program product including computer program instructions. The computer program instructions cause a computer to perform above method for transmission.

The embodiments of the present disclosure provide a computer program. When the computer program is run on a computer, the computer performs above method for transmission.

BRIEF DESCRIPTION OF THE DRAWINGS

FIG. 2 is a schematic flow chart of a method for transmission according to an embodiment of the present disclosure.

FIG. 3 is a schematic flow chart of a method for transmission according to an embodiment of the present disclosure.

DETAILED DESCRIPTION

Figure 1:
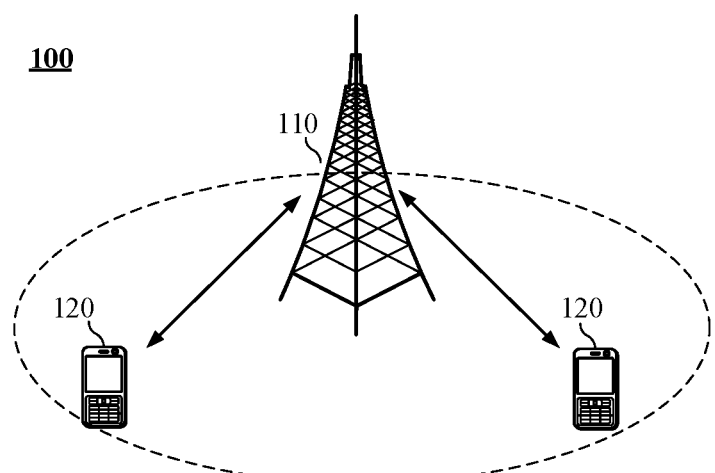
FIG. 1 is a schematic diagram of an application scenario according to embodiments of the present disclosure.

In the interference-controlled New Radio Unlicensed (NRU) scenario, how to reduce the latency of resource transmission is a problem that needs to be considered.

According to the embodiments of the present disclosure, the latency of the resource transmission, especially the deprioritized resource, can be reduced.

The technical solutions in the embodiments of the present disclosure will be described below with reference to the drawings in the embodiments of the present disclosure.

The technical solutions of the embodiments of the present disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) System, Universal Mobile Telecommunications System (UMTS), Wireless Local Area Network (WLAN), Wireless Fidelity (WiFi), 5th-Generation (5G) system or other communication systems.

Generally speaking, conventional communication systems support a limited number of connections, and are easy to implement. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present disclosure can also be applied to these communication systems.

Alternatively, the communication systems in the embodiments of the present disclosure may be applied to a Carrier Aggregation (CA) scenario, a Dual Connectivity (DC) scenario, and a Standalone (SA) network distribution scenario.

Alternatively, the communication system in the embodiments of the present disclosure may be applied to an unlicensed spectrum. The unlicensed spectrum may also be considered a shared spectrum. Alternatively, the communication system in the embodiment of the present disclosure may also be applied to a licensed spectrum. The licensed spectrum may also be considered a non-shared spectrum.

The various embodiments of the present disclosure are described in combination with a network device and a terminal device. The terminal device may also be referred to as a User Equipment (UE), an access terminal, a user unit, a user station, a mobile station, a mobile stage, a remote station, a remote terminal, a mobile device, a user terminal, a terminal, a wireless communication device, a user agent or a user device, etc.

The terminal device may be a STAION (ST) in the WLAN, a cellular telephone, a cordless telephone, a Session Initiation Protocol (SIP) telephone, a Wireless Local Loop (WLL) station, a Personal Digital Assistant (PDA) station, a handheld device having wireless communication functionality, a computing device or other processing device connected to a wireless modem, a vehicle-mounted device, a wearable device, a terminal device in a next-generation communication system such as an NR network, or a terminal device in the future evolved Public Land Mobile Network (PLMN) network.

In embodiments of the present disclosure, the terminal device may be deployed on land including indoors or outdoors, hand-held, wearable or vehicle-mounted, and it may also be deployed on the water (such as ships, etc.), and it may also be deployed in the air (such as airplanes, balloons and satellites, etc.).

In the embodiments of present disclosure, the terminal device may be a Mobile Phone, a tablet computer (Pad), a computer with wireless transceiver function, an Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city or smart home, etc.

By way of example but not limitation, in embodiments of the present disclosure, the terminal device may also be a wearable device. The wearable device may also be referred a wearable intelligent device, which is the general name of the wearable device developed by applying wearable technology in the intelligently design of daily wear, such as glasses, gloves, watches, clothing and shoes, etc. The wearable device is a portable device that is worn directly on the body or integrated into the clothes or accessories of the user. The wearable device is not only a kind of hardware device, but also realizes powerful functions through software support, data interaction and cloud interaction. The generalized wearable smart device has full functions and a large size, and can realize complete or partial functions without relying on smart phones, such as smart watches or smart glasses, or only focus on certain application functions, which need to be used in conjunction with other device such as a smart phone, such as various smart bracelets and smart jewelry for monitoring physical signs.

In the embodiments of the present disclosure, the network device may be a device for communicating with a mobile device. The network device may be an Access Point (AP) in WLAN, a Base Transceiver Station (BTS) in GSM or CDMA, a NodeB (NB) in WCDMA, an Evolutional Node B (eNB or eNodeB) in LTE, a relay station or an Access Point, a vehicle-mounted device, a wearable device, a network device (gNB) in NR network, a network device in future evolved PLMN network or a network device in NTN network.

By way of example but not limitation, in embodiments of the present disclosure, the network device may have mobility characteristics. For example, the network device may be a mobile device. Alternatively, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, and the like. Alternatively, the network device may also be a base station arranged on land, water and the like.

In the embodiments of that present disclosure, the network device may provide services for a cell. The terminal device communicates with the network device through transmission resources (e.g. frequency domain resources, or spectrum resources) used by the cell. The cell may be a cell corresponding to a network device (e.g. a base station). The cell may belong to a macro base station, or belong to a base station corresponding to Small cell. The Small cell here may include a Metro cell, a Micro cell, a Pico cell, Femto cell, etc. These Small cells have the characteristics of small coverage and low transmission power, and are suitable for providing high-speed data transmission services.

FIG. 1 illustrates a communication system 100 exemplarily. The communication system includes a network device 110 and two terminal devices 120. Alternatively, the communication system 100 may include a plurality of network devices 110, and other numbers of terminal devices 120 may be included within the coverage of each network device 110. Embodiments of the present disclosure are not limited thereto.

Alternatively, the communication system 100 may also include other network entities such as a Mobility Management Entity (MME), an Access and Mobility Management Function (AMF), etc. Embodiments of the present disclosure are not limited thereto.

The network device can also include access network device and core network device. That is, the wireless communication system also includes a plurality of core networks for communicating with the access network device. The access network device may be an evolutional node B (eNB or e-NodeB), an acer station, a micro base station (also referred to as a "small base station"), a pico base station, an access point (AP), a transmission point (TP) or a new generation Node B (gNodeB) etc. in a long-term evolution (LTE) system, a next-generation system (mobile communication system) (NR) or an authorized auxiliary access long-term evolution (LAA-LTE) system.

It should be understood that a device having a communication function in a network/system in the embodiments of the present disclosure may be referred to as a communication device. Taking the communication system shown in FIG. 1 as an example, the communication device may include a network device and a terminal device having the communication function. The network device and the terminal device may be specific devices in embodiments of the present disclosure, which will not be described herein. The communication device may also include other devices in the communication system, such as a network controller, a mobility management entity and other network entities which are not limited in embodiments of the present disclosure.

It should be understood that the terms "system" and "network" are often used interchangeably herein. In the present disclosure, the term "and/or" is used to describe the association relationship between related objects. The term "and/or" represents that there are three relationships. For example, A and/or B represents that there are three situations: A exists alone, A and B exist simultaneously, and B exists alone. In addition, in the present disclosure, the character "/" generally represents that there is "or" relationship between the related objects before and after.

It should be understood that the reference to "indication" in embodiments of the present disclosure may be a direct indication, may be an indirect indication, or may be indicative of an association relationship. For example, A indicates B, which may mean that A directly indicates B, for example, B may be obtained through A, It may also mean that A indirectly indicates B, for example, A indicates C, and B may be obtained through C. It may also represent that there is an association relationship between A and B.

In the description of embodiments of the present disclosure, the term "corresponding" may represent that there is a direct correspondence or an indirect correspondence relationship between the two elements, may also represent that there is an association relationship between the two elements, or a relationship between indication and being indicated, configuration and being configured, etc.

In order to facilitate understanding of the technical solutions of the embodiments of the present disclosure, the relevant technologies of the embodiments of the present disclosure are described below. The following related technologies may be arbitrarily combined with the technical solutions of the embodiment of the present disclosure as an optional solution, all of which belong to the protection scope of the embodiment of the present disclosure.

CG enhancement in URLLC is introduced below.

In embodiments of the present disclosure, it is desirable to consider supporting URLLC services in the interference-controlled NRU scenario. Specifically, the use manner of NRU CG and ULRRC CG enhancements may be considered in an NRU scenario, such as introducing coordinated UL CG enhancement in NRU and URLLC to apply to unlicensed spectrum.

In order to support the high latency requirement of URLLC services, URLLC enhances CG period and supports any slot-level service period.

In order to support a variety of URLLC services and the high latency requirements of URLLC services, URLLC introduces multiple CGs. Hybrid Automatic Repeat Request (HARQ) processes of different CG configurations are different, and the processes of different CG are ensured to be different by HARQ process identifier-offset 2 (HARQ-ProcID-Offset2).

Since there is a case of the confliction between CG resource and other resource, automatic transmission for CG is introduced to ensure that the Medium Access Control (MAC) Protocol Data Unit (PDU) which has been packed (such as Deprioritized MAC PDU) in CG resource will not be discarded or be transmitted as soon as possible. For the CG, that cannot be transmitted due to resource confliction, of the packed MAC PDU, the subsequent CG resource, in the same CG configuration, in the same HARQ process may be used for new transmission. The use of automatic transmission is determined by an automatic transmission parameter, such as autonomous TX.

The related content of NRU is introduced below.

The goal of NRU project is to make NR work in unlicensed spectrum, for example, including the following working scenarios.

Scenario A: in the CA scenario, Primary cell (PCell) is the licensed spectrum, and Secondary Cells (SCells) working on the unlicensed spectrum aggregately in the CA manner.

Scenario B: in the DC working scenario, PCell is a LTE licensed spectrum, and Primary Secondary Cell (PScell) is a NR unlicensed spectrum.

Scenario C: in the independent working scenario, NR works in the unlicensed spectrum as an independent cell.

Scenario D: in the NR single cell scenario, Uplink (UL) works in the licensed spectrum and Downlink (DL) works in the unlicensed spectrum.

Scenario E: in DC working scenario, PCell is the NR licensed spectrum and PScell is the NR unlicensed spectrum.

Generally speaking, the operating Band of NRU is 5 GHz unlicensed spectrum and 6 GHz unlicensed spectrum. On the unlicensed spectrum, NRU should be designed to ensure the fairness between it and other systems that are already working on these unlicensed spectrums, such as WiFi etc. The principle of fairness includes that the impact of NRU on the systems (for example, WiFi) that are already deployed on unlicensed spectrum cannot exceed the impact between these systems.

In order to ensure fair coexistence among systems in the unlicensed spectrum, energy detection has been agreed as a basic coexistence mechanism. The general energy detection mechanism is Listen Before Talk (LBT) mechanism. The basic principle of this mechanism is that the base station or terminal (transmitter) needs to listen for a period of time before transmitting data on the unlicensed spectrum. If the result of listening indicates that the channel is idle, the transmitter can transmit data to the receiver. If the result of listening indicates that the channel is occupied, the transmitter needs to back-off for a period of time according to the regulations and then continue to listen to the channel until the result of channel listening is idle, so as to transmit data to the receiver.

At present, there are four channel access categories in NRU.

Category 1: Direct Transmission Category.

This category may be used for the transmission (TX) side to transmit quickly after the switching gap in Channel Occupancy Time (COT). Switching gap is the switching time at which transmission is received, typically not more than 16 us.

Category 2: LBT Category without Random Back-Off

This category means that the time for UE to listen the channel is certain, which is generally short, such as 25 us.

Category 3: LBT Category with Random Back-Off (Competition Window is Fixed)

In the LBT process, the transmission side randomly takes a random value in the competition window to determine the time of listening channel.

Category 4: LBT Category with Random Back-Off (Competition Window is not Fixed)

In the LBT process, the transmission side randomly takes a random value in the competition window to determine the time of listening channel, and the competition window is variable.

To sum up, for the terminal, the data transmission from the base station to the terminal needs to be within the Maximum Channel Occupancy Time (MCOT). If the base station does not preempt the channel, that is, outside the MCOT, the terminal will not receive the scheduling data provided from the base station to this terminal.

The uplink LBT failure in NR-U is introduced below.

The uplink transmission initiated by UE mainly includes the following categories.

Scheduling Request (SR): used to request an uplink resource.

Physical Random Access Channel (PRACH) transmission: since Random Access Channel (RACH) is triggered, the UE needs to send message 1 (msg1).

Physical Uplink Shared Channel (PUSCH) transmission: including the uplink data transmission based on CG and the uplink data transmission based on Dynamic Grant (DG).

Physical layer signaling transmission: including an acknowledge/non-acknowledge (ACK/NACK) feedback and Channel State Information (CSI) reporting, etc.

In the unlicensed band, the UE needs to firstly use LBT to listen whether the channel is available before transmitting SR, PRACH or PUSCH. If it is not available, i.e. the LBT fails, the UE needs to wait until the next transmission opportunity to perform the LBT again. If LBT failure is detected, it is needed to notify the MAC layer of the information of LBT failure.

CG enhancement in NRU is introduced below.

In order to select resource flexibly, the HARQ process of NRU CG is not calculated according to the formula, but selected by UE itself. For one CG resource, the RRC configures a HARQ process set, and the UE may select a HARQ process in the set for this CG transmission. The specific configured HARQ process interval is determined by harq-ProcID-Offset and nrofHARQ-Processes.

To support back-to-back resource configuration, NRU introduces multiple CGs. Multiple CG configurations may share the HARQ process.

The cg-Retransmission Timer (CG retx Timer) is introduced to support the automatic retransmission of a resource when the CG resource cannot be transmitted due to LBT failure. After the CG retx Timer expires, if CG timer does not expire, the corresponding HARQ process may be retransmitted.

CG transmission may be interrupted by dynamically scheduling Downlink Control Information (DCI) and Downlink Feedback Information (DFI). For example, as shown in Table 1 below, the CG timer is stopped when the DFI is ACK, the CG timer is not impacted when the DFI is NACK, and the CG timer is started or restarted when the DCI is new transmission (new tx) or retransmission (retx). When the CG timer expires, the CG retx Timer is stopped. The CG retx Timer is stopped when the DFI is ACK, NACK, new tx, or retx.

TABLE 1

|  | DFI = ACK | DFI = NACK | DCI = new tx | DCI = retx | CG timer expires |
|---|---|---|---|---|---|
| CG timer | stop | No impact | start/restart | start/restart | none |
| CG retx Timer | stop | stop | stop | stop | stop |

Both the CG timer and the CG retx Timer in the NRU are started at the beginning of the first symbol of the PUSCH transmission. However, if the PUSCH corresponds to a deprioritized resource, part of symbols may be transmitted, but the complete symbols are not transmitted. Therefore, the transmission in the first symbol of the PUSCH may cause subsequent CG resource to be unavailable for UE automatic transmission of this deprioritized resource (because the CG timer is started), which results in transmission latency of this deprioritized resource (automatic retransmission can only be performed after CG retx Timer expires). In addition, if it is considered that the transmission is performed when the timer is started, then the UE automatic transmission function will not work.

FIG. 2 is a schematic flow chart of a method for transmission 200 according to an embodiment of the present disclosure. The method may optionally be applied to the system shown in FIG. 1, but is not limited thereto. The method includes at least part of the following contents.

In operation S210, a terminal device determines a state of a Hybrid Automatic Repeat Request (HARQ) process and/or a timer based on a satisfied condition in a case of configuring a CG retx Timer.

Exemplarily, the method for transmission of the embodiments of the present disclosure may be used to transmit a deprioritized MAC PDU. The terminal device, in the case of configuring the CG retx Timer, may determine the state of the HARQ process based on the satisfied condition. For example, in the NRU scenario, the HARQ process may be set to pending. If the CG timer and/or CG retx Timer are/is running, the CG timer and/or CG retx Timer may also be stopped, and the subsequent CG resource uses NRU automatic retransmission for UE automatic retransmission. For another example, in the URLLC scenario, the HARQ process may be set to not pending. If the CG timer and/or the CG retx Timer are/is running, the CG timer and/or the CG retx Timer may also be stopped, and the subsequent CG resource uses URLLC automatic transmission for UE automatic transmission.

Alternatively, the method further includes the following operation.

The terminal device receives a CG resource. The CG resource includes configuration information.

Exemplarily, after receiving the CG resource, the UE configures the corresponding CG resource based on the configuration information in the CG resource. If the confliction between the CG resource and a CG resource is existed, or the confliction between CG resource and other resource is existed, the UE may only transmit the prioritized resource, and not transmit the deprioritized resource.

Alternatively, in an example of the first manner, the configuration information includes at least one of the following: one or more HARQ process identifiers corresponding to the CG resource, CG timer, and CG retx Timer.

Exemplarily, the first manner may be applied to the NRU scenario, and the UE works in an unlicensed band, or a scenario where a CG retx Timer is configured.

Alternatively, the satisfied condition includes at least one of the following first conditions.

A deprioritized MAC PDU is corresponded. For example, the CG resource corresponds to the deprioritized MAC PDU, the HARQ process corresponds to the deprioritized MAC PDU, or the HARQ process corresponding to the CG resource corresponds to the deprioritized MAC PDU.

The corresponding transmission is not performed. For example, the transmission corresponding to the CG resource is not performed, the transmission corresponding to the HARQ process is not performed, or the transmission corresponding to the HARQ process corresponding to the CG resource is not performed.

The corresponding transmission has been performed. For example, the transmission corresponding to the CG resource has been performed, the transmission corresponding to the HARQ process has been performed, or the transmission corresponding to the HARQ process corresponding to the CG resource has been performed.

A LBT failure indication is not received from a low layer.

A resource is a deprioritized resource. For example, the CG resource is a deprioritized resource. For another example, the DG resource is a deprioritized resource.

Logical channel (LCH)-based prioritization is configured.

Automatic transmission parameter (autonomous TX) is not configured.

An automatic retransmission is used for the transmission. For example, NRU automatic retransmission is used for transmission. Specifically, automatic retransmission is performed using CG retx Timer expiring information and/or DFI information.

The corresponding CG retx Timer is not running. For example, the CG retx Timer corresponding to the CG resource is not running, the CG retx Timer corresponding to the HARQ process is not running, or the CG retx Timer corresponding to the HARQ process corresponding to the CG resource is not running.

Alternatively, determining the state of the HARQ process and/or the timer in a case that the first condition is satisfied includes at least one of the following.

The HARQ process corresponding to the CG resource is set to pending.

The CG timer is stopped.

The CG retx Timer is stopped.

Alternatively, in the second manner, the configuration information includes at least one of the following: one or more HARQ process identifiers corresponding to the CG resource, CG timer, CG retx Timer, and autonomous TX.

Exemplarily, the second manner may be applied to a URLLC scenario, and the UE works in a licensed band, or a scenario where a CG retx Timer is configured.

Alternatively, the satisfied condition includes at least one of the following second conditions.

A deprioritized MAC PDU is corresponded.

A corresponding transmission is not performed.

A LBT failure indication is not received from a low layer.

A resource is a deprioritized resource.

LCH-based prioritization is configured.

Autonomous TX is configured.

A corresponding HARQ process is pending.

Transmission in the corresponding HARQ process is new transmission.

Transmission in the corresponding HARQ process is not retransmission.

The automatic TX is used for automatic transmission. For example, URLLC automatic transmission is used. Specifically, for example, when the previous resource corresponding to the HARQ process is a deprioritized CG and the MAC PDU is acquired, the subsequent CG resource corresponding to the process is used to perform automatic transmission.

The corresponding CG retx Timer is not running.

In the second condition, a description similar to that of the first condition may be referred to the related example in the first condition and will not be repeated here.

Alternatively, the satisfied condition includes at least one of the following third conditions.

A corresponding HARQ process obtains a MAC PDU that needs to be transmitted. For example, the HARQ process corresponding to the CG resource obtains the MAC PDU that needs to be transmitted.

An LBT failure indication is received from a low layer.

The corresponding transmission is not performed due to a LBT failure. For example, the transmission corresponding to the CG resource is not performed due to the LBT failure, the transmission corresponding to HARQ process is not performed due to the LBT failure, or the transmission corresponding to the HARQ process corresponding to the CG resource is not performed due to the LBT failure.

The resource is not transmitted or the transmission is not completed due to the LBT failure. For example, the CG resource and/or DG resource are/is not transmitted or the transmission is not completed due to the LBT failure.

The LCH-based prioritization is configured.

An automatic TX is configured.

A corresponding HARQ process is pending.

Transmission in the corresponding HARQ process is new transmission.

Transmission in the corresponding HARQ process is not retransmission.

The automatic TX is used for automatic transmission.

A corresponding CG retx Timer is not running.

In the third condition, a description similar to that of the first condition may be referred to the related example in the first condition and will not be repeated here. In the third condition, the resource of a LBT failure may be retransmitted using URLLC automatic transmission category.

Alternatively, determining the state of the HARQ process and/or the timer in a case that the second condition and/or the third condition are/is satisfied includes at least one of the following operations.

The HARQ process corresponding to the CG resource is set to not pending.

The CG timer is stopped.

The CG retx Timer is stopped.

Alternatively, the method further includes the following operation. The terminal device transmits a prioritized resource and does not transmit a deprioritized resource in at least one of the following cases.

The CG resource is conflicted with a CG resource.

The CG resource is conflicted with a DG resource.

The CG resource is conflicted with a SR resource.

The DG resource is conflicted with the SR resource.

Uplink grant is conflicted with a Physical Uplink Control Channel (PUCCH) resource.

By adopting the embodiment of the present disclosure, the deprioritized MAC PDU/CG may be transmitted, and the latency of resource transmission can be avoided.

FIG. 3 is a schematic flow chart of a method for transmission 300 according to an embodiment of the present disclosure. The method can optionally be applied to the system shown in FIG. 1, but is not limited thereto. The method includes at least part of the following contents.

In operation S310, the terminal device starts the CG timer and/or the CG retx Timer at a first time. The first time includes at least one of following: an end of a last symbol of a resource, and after the end of the last symbol of the resource.

For example, the CG timer and/or the CG retx Timer may be started at the end of last symbol of the CG resource. As another example, the CG timer and/or the CG retx Timer may be started after the end of the last symbol of the CG resource. As another example, the CG timer and/or the CG retx Timer may be started at the end of last symbol of the DG resource. As another example, the CG timer and/or the CG retx Timer may be started after the end of the last symbol of the DG resource. For another example, the CG timer and/or the CG retx Timer may be started at the end of last symbol of the corresponding PUSCH resource. As another example, the CG timer and/or the CG retx Timer may be started after the end of the last symbol of the corresponding PUSCH resource.

Since the CG timer and/or the CG retx Timer may not be started at the beginning of the first symbol of the PUSCH transmission, the CG timer and/or the CG retx Timer may also be started at or after the end of last symbol if the PUSCH corresponds to a deprioritized resource. The PUSCH may include the CG resource and/or the DG resource. In this way, it can be avoided that the subsequent CG resource cannot be used for the UE automatic transmission of the deprioritized resource due to the earlier starting of the timer, thereby reducing the transmission latency of the deprioritized resource. Similarly, the problem that autonomous TX function cannot be used also can be avoided.

Alternatively, the method further includes the following operation.

The terminal device receives a CG resource. The CG resource includes configuration information.

Exemplarily, after receiving the CG resource, the UE configures the corresponding CG resource based on the configuration information in the CG resource. If the confliction between the CG resource and a CG resource is existed, or the confliction between CG resource and other resource is existed, the UE may only transmit the prioritized resource, and not transmit the deprioritized resource.

Alternatively, the configuration information includes at least one of the following: one or more HARQ process identifiers corresponding to the CG resource, CG timer, and CG retx Timer.

Alternatively, the method further includes the following operation. If the fourth condition is satisfied, the HARQ process corresponding to the CG resource is set to pending in at least one of the following cases.

Autonomous TX is not configured.

The automatic TX is not configured, but the LCH-based prioritization is configured.

Automatic retransmission is used.

The CG retx Timer is configured.

Alternatively, the fourth condition includes at least one of the following.

A deprioritized MAC PDU is existed. For example, the deprioritized MAC PDU is existed in the CG resource, the deprioritized MAC PDU is existed in HARQ process, or the deprioritized MAC PDU is existed in the HARQ process corresponding to the CG resource.

The transmission is not performed due to resource confliction.

A deprioritized resource is corresponded. For example, a CG resource, a HARQ process or a HARQ process corresponding to a CG resource corresponds to the deprioritized resource, the previous resource corresponding to the HARQ process is the deprioritized resource, or the previous resource corresponding to the HARQ process corresponding to the CG resource is the deprioritized resource.

A corresponding transmission is not performed, the corresponding transmission has not been completed, or the corresponding transmission is not completely transmitted. For example, the transmission corresponding to the CG resource is not performed, the transmission corresponding to the CG resource has not been completed, or the transmission corresponding to the CG resource is not completely transmitted. The transmission corresponding to the HARQ process is not performed, the transmission corresponding to the HARQ process has not been completed, or the transmission corresponding to the HARQ process is not completely transmitted. Alternatively, the transmission corresponding to the HARQ process corresponding to the CG resource is not performed, the transmission corresponding to the HARQ process corresponding to the CG resource has not been completed, or the transmission corresponding to the HARQ process corresponding to the CG resource is not completely transmitted.

The corresponding transmission has been performed. For example, the transmission corresponding to the CG resource has been performed, the transmission corresponding to the HARQ process has been performed, or the transmission corresponding to the HARQ process corresponding to the CG resource has been performed.

A LBT failure indication is not received from a low layer.

A resource is the deprioritized resource. For example, the CG resource is the deprioritized resource. For another example, the DG resource is the deprioritized resource. The corresponding previous CG or DG resource is the deprioritized resource.

A corresponding CG retx Timer is not running. For example, the CG retx Timer corresponding to the CG resource is not running, the CG retx Timer corresponding to the HARQ process is not running, or the CG retx Timer corresponding to the HARQ process corresponding to the CG resource is not running.

Alternatively, the method further includes the following operation. If the fifth condition and/or the sixth condition are/is satisfied, the HARQ process corresponding to the CG resource is set to not pending in at least one of the following cases.

Autonomous TX is configured.

The autonomous TX is configured and LCH-based prioritization is configured.

Automatic transmission is used.

The CG retx Timer is not configured.

Alternatively, the fifth condition includes at least one of the following.

A deprioritized MAC PDU is existed.

Transmission is not performed due to resource confliction.

A deprioritized resource is corresponded.

A corresponding transmission is not performed.

The corresponding transmission has been performed.

A LBT failure indication is not received from a low layer.

A resource is the deprioritized resource.

In the fifth condition, a description similar to that of the fourth condition may be referred to a related example in the fourth condition and will not be repeated here.

Alternatively, the sixth condition includes at least one of the following.

The corresponding HARQ process obtains a MAC PDU that needs to be transmitted. For example, the HARQ process corresponding to the CG resource obtains the MAC PDU that needs to be transmitted.

An LBT failure indication is received from a low layer.

A corresponding transmission is not performed due to a LBT failure. For example, the transmission corresponding to the CG resource is not performed due to the LBT failure, the transmission corresponding to the HARQ process is not performed due to the LBT failure, or the transmission corresponding to the HARQ process corresponding to the CG resource is not performed due to the LBT failure.

The resource is not transmitted or the transmission is not completed due to the LBT failure. For example, the CG resource and/or the DG resource are/is not transmitted or the transmission is not completed due to LBT failure.

By adopting the method for transmission of the embodiment, the starting time of the timer is modified, a manner of automatic transmission or automatic retransmission of the deprioritized resource by the UE is provided, thereby avoiding the latency of the resource transmission.

Example 1: in a case that a CG retx Timer is configured and a first condition is satisfied, at least one of the following operations is performed: considering the corresponding HARQ process to be pending, stopping the CG timer, and stopping the CG retx Timer.

The specific implementation process is as follows.

1. The network configures a CG resource for UE. For the CG resource, specifically, at least one of the following configuration information may be included.

a) One or more HARQ process IDs corresponding to the CG resource is configured, such as the resource corresponding to HARQ processes 1, 2 and 3.

b) The CG timer is configured.

c) The CG retx Timer is configured (the autonomous TX is not configured).

2. The UE receives the configuration information of the CG resource of the network, and configures and uses the corresponding CG resource. The specific operation is as follows.

In some cases, CG resource may be conflicted with CG resource, CG resource may be conflicted with other resources (such as DG resource, SR resource, etc.), DG resource may be conflicted with SR resource, or uplink grant may be conflicted with the PUCCH resource. In case of resource confliction, the UE may only transmit one resource (prioritized resource) and not transmit the deprioritized resource.

For the CG resource, in a case that the CG retx Timer is configured and the first condition is satisfied, at least one of the following operations may be performed: considering the corresponding HARQ process to be pending, stopping the CG timer, and stopping the CG retx Timer.

The first condition may be at least one of the following.
A deprioritized MAC PDU is corresponded.
The corresponding transmission is not performed.
The corresponding transmission has been performed.
A LBT failure indication is not received from a low layer.
A resource is a deprioritized resource (such as in a case of resource confliction).
Logical channel (LCH)-based prioritization is configured.
An automatic TX is not configured.
An automatic retransmission is used for transmission.
The corresponding CG retx Timer is not running.

For example, if the autonomous TX is not configured, the CG resource corresponds to the deprioritized MAC PDU, and the LBT failure indication is not received from the low layer, the UE considers the HARQ process corresponding to the CG resource to be pending. Also, if the CG timer and CG retx Timer are running, the CG timer and CG retx Timer may be stopped. For the subsequent CG resource, NRU automatic retransmission may be used for UE automatic retransmission transmission.

For another example, if the autonomous TX is not configured, the transmission corresponding to the CG resource is not performed, or if the transmission corresponding to the CG resource is not performed and the LBT failure indication is not received from the low layer, the UE considers the corresponding HARQ process to be pending. Also, if the CG timer and CG retx Timer are running, the CG timer and CG retx Timer may be stopped. For the subsequent CG resources, NRU automatic retransmission may be used for UE automatic retransmission transmission.

In this example, in a case that the CG retx Timer is configured but autonomous TX is not configured, the deprioritized MAC PDU/CG can be transmitted, and the latency of resource transmission can be avoided.

Example 2: in a case that the CG retx Timer is configured and the second condition is satisfied, at least one of the following operations is performed: considering the corresponding HARQ process to be not pending, stopping the CG timer, and stopping the CG retx Timer.

The specific implementation process is as follows.

1. The network configures the CG resource for the UE. For the CG resource, specifically, at least one of the following configuration information may be included.

a) One or more HARQ process IDs corresponding to the CG resource is configured, such as the resource corresponding to HARQ processes 1, 2 and 3.

b) The CG timer is configured.

c) The CG retx Timer is configured.

d) The autonomous TX is configured.

2. The UE receives the CG configuration information of the network and configures and uses the corresponding CG resource. The specific operation is as follows.

In some cases, CG resource may be conflicted with CG resource, CG resource may be conflicted with other resources (such as DG resource, SR resource, etc.), DG resource may be conflicted with SR resource, or uplink grant may be conflicted with the PUCCH resource. In case of resource confliction, the UE may only transmit one resource (prioritized resource) and not transmit the deprioritized resource.

For the CG resource, when the CG retx Timer is configured and the second condition and/or the third condition are/is satisfied, at least one of the following operations may be performed: considering the corresponding HARQ process to be not pending, stopping the CG timer, and stopping the CG retx Timer.

The second condition may be at least one of the following.
The deprioritized MAC PDU is corresponded.
The corresponding transmission is not performed.
The LBT failure indication is not received from the low layer.
The resource is a deprioritized resource (such as in a case of resource confliction).
Logical channel (LCH)-based prioritization is configured.
An automatic TX is configured.
The automatic TX is used for the automatic transmission.
The corresponding HARQ process is pending.

The transmission in the corresponding HARQ process is new transmission.

The transmission in the corresponding HARQ process is not retransmission.

The corresponding CG retx Timer is not running.

The third condition may be at least one of the following.

The corresponding HARQ process obtains a MAC PDU that needs to be transmitted.

An LBT failure indication is received from the low layer.

The corresponding HARQ process is pending.

The transmission in the corresponding HARQ process is new transmission.

The transmission in the corresponding HARQ process is not retransmission.

The corresponding transmission is not performed due to the LBT failure.

The resource is not transmitted or the transmission is not completed due to the LBT failure.

The LCH-based prioritization is configured.

The autonomous TX is configured.

The automatic TX is used for the automatic transmission.

The corresponding CG retransmission Timer is not running.

In addition, for the CG resource, in a case that the CG retx Timer is not configured and the second condition and/or the third condition are/is satisfied, at least one of the following operations may be performed: considering the corresponding HARQ process to be not pending, stopping the CG timer, and stopping the CG retx Timer.

The second condition and/or the third condition are/is the same as above and will not be repeated here.

For example, if the autonomous TX is configured, the CG corresponds to the deprioritized MAC PDU, and the LBT failure indication is not received from the low layer, the UE considers the corresponding HARQ process to be not pending, and if the CG timer and CG retx Timer are running, the CG timer and CG retx Timer are stopped. For the subsequent CG resources, URLLC automatic transmission is used for UE automatic transmission.

For another example, if the autonomous TX is configured, the transmission corresponding to the CG is not performed, or if the transmission corresponding to the CG is not performed and the LBT failure indication is not received from the low layer, the UE considers the corresponding HARQ process to be not pending, and meanwhile, if the CG timer and the CG retx Timer are running, the CG timer and the CG retx Timer are stopped. For the subsequent CG resource, URLLC automatic transmission may be used for UE automatic transmission.

In this example, in a case that the CG retx Timer and the autonomous TX are configured, the deprioritized MAC PDU/CG can be transmitted, and the latency of resource transmission can be avoided.

Example 3: the starting time of timer is modified. For example, the CG timer and/or CG retx Timer are/is started at/after the end of the last symbol of CG resource.

The specific implementation process is as follows.

1. The network configures the CG resource for the UE. For the CG resource, specifically, at least one of the following configuration information may be included.

a) One or more HARQ process IDs corresponding to the CG resource is configured, such as the resource corresponding to HARQ processes 1, 2 and 3.

b) The CG timer is configured.

c) The CG retx Timer is configured.

2. The UE receives the CG configuration information of the network, and configures and uses the corresponding CG resource. The specific operation is as follows.

In some cases, CG may be conflicted with CG resource, or CG may be conflicted with other resources (such as DG, SR, etc.). In case of resource confliction, the UE only transmits one resource of its own (prioritized resource), and does not transmit the deprioritized resource.

The UE starts the CG timer and/or the CG retx Timer at the first time. The first time is one of the following.

The CG timer and/or the CG retx Timer are/is started at the end of the last symbol of the CG resource.

The CG timer and/or the CG retx Timer are/is started after the end of the last symbol of the CG resource.

Scenario 1: if the fourth condition is satisfied, the corresponding HARQ process is set to pending in at least one of the following cases.

The autonomous TX is not configured.

The autonomous TX is not configured, but the LCH-based prioritization is configured.

An automatic retransmission is used.

The CG retx Timer is configured.

The fourth condition is at least one of the following.

A deprioritized MAC PDU is existed in the corresponding HARQ process.

The transmission corresponding to the HARQ process is not performed due to resource confliction.

The corresponding HARQ process corresponds to a deprioritized resource.

Scenario 2: if the fifth condition and/or the sixth condition are/is satisfied, the HARQ process corresponding to the CG resource is set to not pending in at least one of the following conditions.

Autonomous TX is configured.

The autonomous TX is configured and the LCH-based prioritization is configured.

Automatic transmission is used.

The CG retx Timer is not configured.

The fifth condition is at least one of the following.

A deprioritized MAC PDU is existed in the corresponding HARQ process.

The corresponding HARQ process is not performed due to resource confliction.

The corresponding HARQ process corresponds to a deprioritized resource.

The corresponding transmission is not performed.

The corresponding transmission has been performed.

The LBT failure indication is not received from the low layer.

A resource is the deprioritized resource.

The sixth condition is at least one of the following.

The corresponding HARQ process obtains the MAC PDU that needs to be transmitted.

An LBT failure indication is received from the low layer.

A corresponding transmission is not performed due to a LBT failure.

In this example, the starting time of the timer is modified, a manner of automatic transmission or automatic retransmission of the deprioritized resource by the UE is provided, thereby avoiding the latency of the resource transmission.

Figure 4:
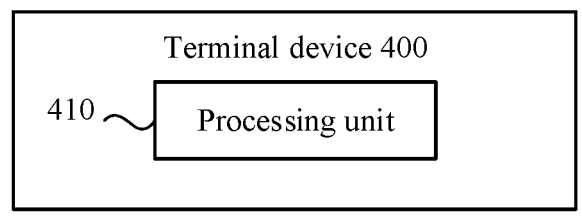
FIG. 4 is a schematic block diagram of a terminal device according to an embodiment of the present disclosure.
Figure 5:
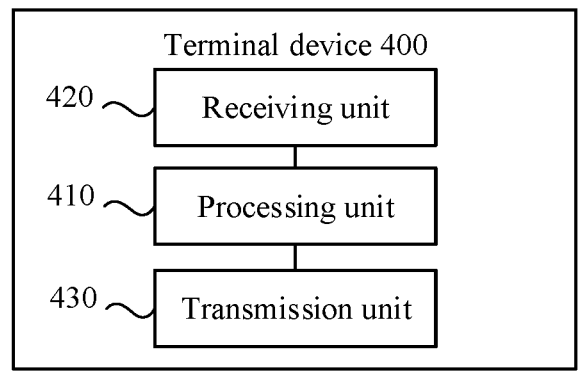
FIG. 5 is a schematic block diagram of a terminal device according to an embodiment of the present disclosure.

FIG. 4 is a schematic block diagram of a terminal device 400 according to an embodiment of the present disclosure. The terminal device 400 includes a processing unit 410.

The processing unit 410 is configured to determine, based on a satisfied condition, a state of a HARQ process and/or a timer in a case of configuring a CG retx Timer.

Alternatively, the terminal device further includes a receiving unit 420.

The receiving unit 420 is configured to receive a CG resource. The CG resource includes configuration information.

Alternatively, the configuration information includes at least one of the following: one or more HARQ process identifiers corresponding to the CG resource, a CG timer, and the CG retx Timer.

Alternatively, the satisfied condition includes at least one of the following first conditions.

A deprioritized MAC PDU is corresponded.
The corresponding transmission is not performed.
The corresponding transmission has been performed.
A LBT failure indication is not received from a low layer.
A resource is a deprioritized resource.
Logical channel (LCH)-based prioritization is configured.
An automatic transmission parameter (automatic TX) is not configured.
An automatic retransmission is used for the transmission.
The corresponding CG retx Timer is not running.

Alternatively, the processing unit determining the state of the HARQ process and/or the timer in a case that the first condition is satisfied includes at least one of the following.

The HARQ process corresponding to the CG resource is set to pending.
The CG timer is stopped.
The CG retx Timer is stopped.

Alternatively, the configuration information includes at least one of the following: one or more HARQ process identifiers corresponding to the CG resource, CG timer, CG retx Timer, and autonomous TX.

Alternatively, the satisfied condition includes at least one of the following second conditions.

A deprioritized MAC PDU is corresponded.
A corresponding transmission is not performed.
A LBT failure indication is not received from a low layer
A resource is a deprioritized resource.
LCH-based prioritization is configured.
Autonomous TX is configured.
A corresponding HARQ process is pending.
Transmission in the corresponding HARQ process is new transmission.
Transmission in the corresponding HARQ process is not retransmission.
The automatic TX is used for automatic transmission.
The corresponding CG retx Timer is not running.

Alternatively, the satisfied condition includes at least one of the following third conditions.

A corresponding HARQ process obtains a MAC PDU that needs to be transmitted.
An LBT failure indication is received from a low layer.
The corresponding transmission is not performed due to a LBT failure.
The resource is not transmitted or the transmission is not completed due to the LBT failure.
The LCH-based prioritization is configured.
Automatic TX is configured.
A corresponding HARQ process is pending.
Transmission in the corresponding HARQ process is new transmission.
Transmission in the corresponding HARQ process is not retransmission.
The automatic TX is used for automatic transmission.
A corresponding CG retx Timer is not running.

Alternatively, the processing unit determining the state of the HARQ process and/or the timer in a case that the second condition and/or the third condition are/is satisfied includes at least one of the following.

The HARQ process corresponding to the CG resource is set to not pending.
The CG timer is stopped.
The CG retx Timer is stopped.

Alternatively, the terminal device further includes a transmission unit 430.

The transmission unit 430 is configured to transmit a prioritized resource and not to transmit a deprioritized resource in at least one of the following cases.

CG resource is conflicted with CG resource.
CG resource is conflicted with DG resource.
CG resource is conflicted with SR resource.
DG resource is conflicted with SR resource.
Uplink grant is conflicted with a Physical Uplink Control Channel (PUCCH) resource.

The terminal device 400 of the embodiment of the present disclosure can implement the corresponding functions of the terminal device in the above method embodiments. The flows, functions, implementation manners and beneficial effects corresponding to various modules (sub-modules, units or components, etc.) in the terminal device 400 can be referred to the corresponding description in the above method embodiments, and will not be repeated here. It should be noted that the functions described with respect to various modules (sub-modules, units, components, etc.) in the terminal device 400 of the embodiment of the present disclosure may be implemented by different modules (sub-modules, units, components, etc.) or by the same module (sub-module, unit, component, etc.).

Figure 6:
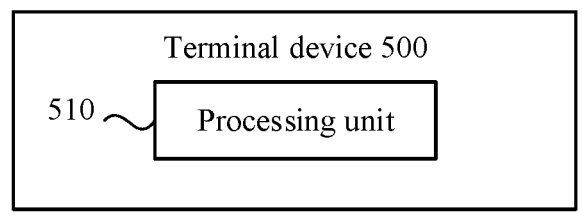
FIG. 6 is a schematic block diagram of a terminal device according to an embodiment of the present disclosure.

FIG. 6 is a schematic block diagram of a terminal device 500 according to an embodiment of the present disclosure. The terminal device 500 may include a processing unit 510. The processing unit 510 is configured to start a CG timer and/or a CG retx Timer at a first time. The first time includes at least one of the following: an end of a last symbol of a resource, and after the end of the last symbol of the resource.

Figure 7:
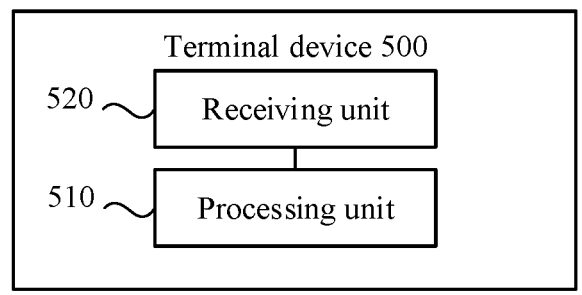
FIG. 7 is a schematic block diagram of a terminal device according to an embodiment of the present disclosure.

Alternatively, as shown in FIG. 7, the terminal device further includes a receiving unit 520.

The receiving unit 520 is configured to receive a CG resource. The CG resource includes configuration information.

Alternatively, the configuration information includes at least one of the following: one or more HARQ process identifiers corresponding to the CG resource, CG timer, and CG retx Timer.

Alternatively, the processing unit is configured to set the HARQ process corresponding to the CG resource to pending if the fourth condition is satisfied in at least one of the following cases.

Autonomous TX is not configured.
The automatic TX is not configured, but the LCH-based prioritization is configured.
An automatic retransmission is used.
The CG retx Timer is configured.

Alternatively, the fourth condition includes at least one of the following.

A deprioritized MAC PDU is existed.
The transmission is not performed due to resource confliction.
A deprioritized resource is corresponded.
A corresponding transmission is not performed.
The corresponding transmission has been performed.
A LBT failure indication is received from a low layer.

A resource is the deprioritized resource.

A corresponding CG retx Timer is not running.

Alternatively, the processing unit is further configured to set the HARQ process corresponding to the CG resource to not pending if the fifth condition and/or the sixth condition are/is satisfied in at least one of the following cases.

Autonomous TX is configured.

The autonomous TX is configured and LCH-based prioritization is configured.

Automatic transmission is used.

The CG retx Timer is not configured.

Alternatively, the fifth condition includes at least one of the following.

A deprioritized MAC PDU is existed.

A transmission is not performed due to resource confliction.

A deprioritized resource is corresponded.

A corresponding transmission is not performed.

The corresponding transmission has been performed.

A LBT failure indication is not received from a low layer.

A resource is the deprioritized resource.

Alternatively, the sixth condition includes at least one of the following.

The corresponding HARQ process obtains a MAC PDU that needs to be transmitted.

An LBT failure indication is received from a low layer.

A corresponding transmission is not performed due to a LBT failure.

The resource is not transmitted or the transmission is not completed due to the LBT failure.

The terminal device 500 of the embodiment of the present disclosure can implement the corresponding functions of the terminal device in the above method embodiments. The flows, functions, implementation manners and beneficial effects corresponding to various modules (sub-modules, units or components, etc.) in the terminal device 500 can be referred to the corresponding description in the above method embodiments, and will not be repeated here. It should be noted that the functions described with respect to various modules (sub-modules, units, components, etc.) in the terminal device 500 of the embodiment of the present disclosure may be implemented by different modules (sub-modules, units, components, etc.) or by the same module (sub-module, unit, component, etc.).

Figure 8:
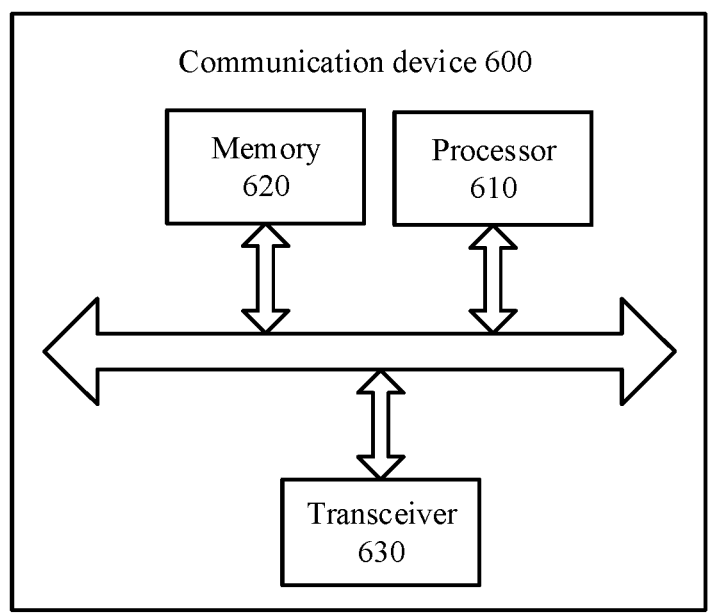
FIG. 8 is a schematic block diagram of a communication device according to embodiments of the present disclosure.

FIG. 8 is a schematic structural diagram of a communication device 600 according to the embodiments of the present disclosure. The communication device 600 includes a processor 610. The processor 610 may invoke and run a computer program from memory to cause the communication device 600 to implement the methods in embodiments of the present disclosure.

Alternatively, the communication device 600 may also include a memory 620. The processor 610 may invoke and run a computer program from the memory 620 to cause the communication device 600 to implement the methods in the embodiments of the present disclosure. The memory 620 may be a separate device independent of the processor 610 or may be integrated in the processor 610.

Alternatively, the communication device 600 may further include a transceiver 630. The processor 610 may control the transceiver 630 to communicate with other devices. Specifically, the transceiver 630 may transmit information or data to other devices, or receive information or data sent by other devices. The transceiver 630 may include a transmitter and a receiver. The transceiver 630 may further include antennas, and the number of antennas may be one or more.

Alternatively, the communication device 600 may be a network device of the embodiments of the present disclosure, and the communication device 600 may implement corresponding processes implemented by the network device in the various methods of the embodiments of the present disclosure. For the sake of brevity, elaborations are omitted herein.

Alternatively, the communication device 600 may be a terminal device of the embodiments of the present disclosure, and the communication device 600 may implement corresponding processes implemented by the terminal device in the various methods of the embodiments of the present disclosure. For the sake of brevity, elaborations are omitted herein.

Figure 9:
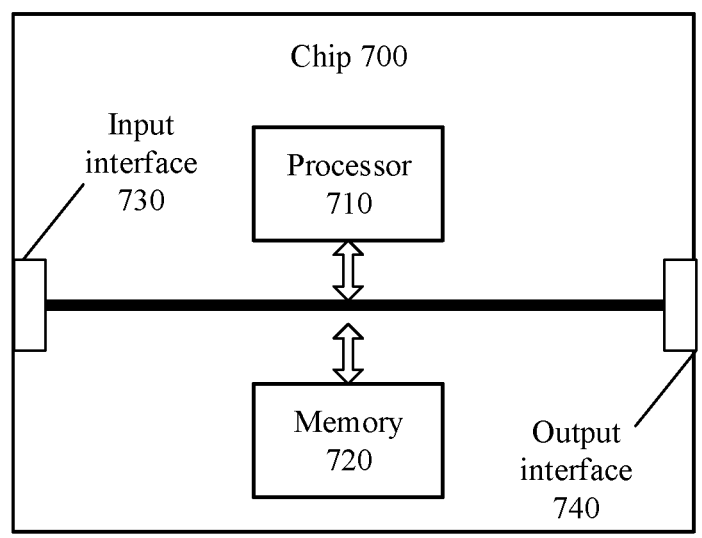
FIG. 9 is a schematic block diagram of a chip according to embodiments of the present disclosure.

FIG. 9 is a schematic structural diagram of a chip 700 according to the embodiments of the present disclosure. The chip 700 includes a processor 710. The processor 710 may invoke and run a computer program from memory to implement the methods in embodiments of the present disclosure.

Alternatively, the chip 700 may further include a memory 720. The processor 710 may invoke and run a computer program from the memory 720 to implement the methods performed by a terminal device or a network device in embodiments of the present disclosure.

The memory 720 may be a separate device independent of the processor 710 or may be integrated in the processor 710.

Alternatively, the chip 700 may further include an input interface 730. The processor 710 may control the input interface 730 to communicate with other devices or chips. Specifically, the input interface 730 may obtain information or data sent by other devices or chips.

Alternatively, the chip 700 may further include an output interface 740. The processor 710 may control the output interface 740 to communicate with other devices or chips. Specifically, the output interface 740 may output information or data to other devices or chips.

Alternatively, the chip may be applied to the network device in the embodiments of the present disclosure, and the chip may implement the corresponding processes implemented by the network device in various methods of the embodiments of the present disclosure. For the sake of brevity, elaborations are omitted herein.

Alternatively, the chip may be applied to the terminal device in the embodiments of the present disclosure, and the chip may implement the corresponding processes implemented by the terminal device in various methods of the embodiments of the present disclosure. For the sake of brevity, elaborations are omitted herein.

The chips applied to the network device and the terminal device may be the same chip or different chips.

It should be understood that the chips referred to in embodiments of the present disclosure may also be referred to as system level chip, system chip, chip system, system-on-chip or the like.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory or may include both a volatile memory and a non-volatile memory. The non-volatile memory may be read-only memory (ROM), programmable ROM (PROM), erasable PROM (EPROM), electrically EPROM (EEPROM) or flash memory. The volatile memory may be a random access memory (RAM).

It should be understood that the memory described above is exemplary but not limiting. For example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), etc. That is, the memory in embodiments of the present disclosure is intended to include but not limited to these and any other suitable types of memory.

Figure 10:
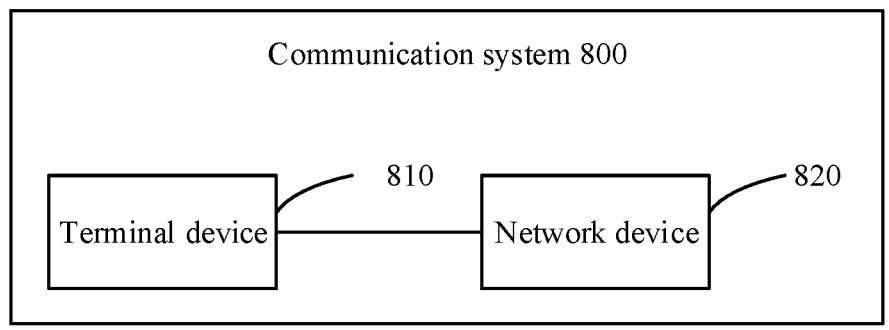
FIG. 10 is a schematic block diagram of a communication system according to embodiments of the present disclosure.

FIG. 10 is a schematic block diagram of a communication system 800 according to embodiments of the present disclosure. The communication system 800 includes a terminal device 810 and a network device 820. The terminal device 810 is configured to determine the state of the HARQ process and/or the timer based on the satisfied condition in the case of configuring the CG retx Timer. The network device 820 is configured to transmit the CG resource to the terminal device. The terminal device 810 may be configured to implement the corresponding functions implemented by the terminal device in the above methods, and the network device 820 may be configured to implement the corresponding functions implemented by the network device in the above methods. For the sake of brevity, elaborations are omitted herein.

The above-described embodiments may be implemented in whole or in part by software, hardware, firmware or any combination thereof. When implemented in software, they may be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or transmitted from one computer-readable storage medium to another. For example, the computer instructions may be transmitted from one Web site, computer, server, or data center to another Web site, computer, server, or data center via wired (for example, coaxial cable, optical fiber, Digital Subscriber Line (DSL)) or wireless (e.g. infrared, wireless, microwave, etc.). The computer-readable storage medium may be any usable medium accessible to a computer or a data storage device such as a server, data center, etc. containing one or more usable media integration. The usable media may be magnetic media (for example, floppy disk, hard disk, magnetic tape), optical media (for example, DVD), or semiconductor media (for example, Solid State Disk (SSD)), etc.

It should be understood that in various embodiments of the present disclosure, the size of the sequence number of the above-mentioned processes does not mean the order of execution, and the execution order of various processes should be determined by its function and inherent logic, and should not be limited in any way to the implementation process of the embodiments of the present disclosure.

Those skilled in the art will clearly appreciate that, for convenience and conciseness of description, the specific operating processes of the above-described systems, devices and units may refer to the corresponding processes in the aforementioned method embodiments. Elaborations are omitted herein.

The above description is only the specific embodiments of the present disclosure, but the scope of protection of the present disclosure is not limited thereto. Any person skilled in the art who is familiar with the technical filed can easily think of changes or substitutions, which should cover within the scope of protection of the present disclosure. Therefore, the protection scope of the present disclosure should be subject to the protection scope of the claims.

The invention claimed is:

1. A method for transmission, applied to a New Radio Unlicensed (NRU) scenario, comprising:
    receiving, by a terminal device, a Configured Grant (CG) resource, wherein the CG resource comprises configuration information, and the configuration information comprises CG timer, CG Retransmission (retx) Timer, and autonomous TX;
    in a case of the CG resource being a deprioritized resource and the CG timer and the CG retx Timer being running, stopping the CG timer and stopping the CG retx Timer, wherein the deprioritized resource is not transmitted by the terminal in at least one of following cases:
        the CG resource is conflicted with a CG resource;
        the CG resource is conflicted with a Dynamic Grant (DG) resource;
        the CG resource is conflicted with a Scheduling Request (SR) resource;
        the DG resource is conflicted with the SR resource; and
        uplink grant is conflicted with a Physical Uplink Control Channel (PUCCH) resource;
    whereinin in repsonse to the CG resource is a previous resource corresponding to a Hybrid Automatic Repeat Request (HARQ) process and a Medium Access Control (MAC) Protocol Data Unit (PDU) is acquired, a subsequent CG resource corresponding to the HARQ process is used to perform automatic transmission.

2. The method of claim 1, wherein the configuration information further comprises:
    one or more HARQ process identifiers corresponding to the CG resource.

3. The method of claim 1, further comprising:
    transmitting, by the terminal device, a prioritized resource in at least one of following cases:
    the CG resource is conflicted with a CG resource;
    the CG resource is conflicted with a Dynamic Grant (DG) resource;
    the CG resource is conflicted with a Scheduling Request (SR) resource;
    the DG resource is conflicted with the SR resource; and
    uplink grant is conflicted with a Physical Uplink Control Channel (PUCCH) resource.

4. The method of claim 1, wherein the CG resource corresponds to a deprioritized MAC PDU.

5. The method of claim 1, wherein Ultra-Reliable and Low Latency Communication (URLLC) automatic transmission is used.

6. The method of claim 1, wherein the CG timer and the CG retx Timer are started at or after an end of a last symbol of a PUSCH resource when the PUSCH resource is a deprioritized resource.

7. A terminal device, applied to a New Radio Unlicensed (NRU) scenario, comprising a processor and a memory, wherein the memory is configured to store a computer program, and the processor is configured to invoke and run the computer program stored in the memory to cause the terminal device to perform:

receiving a CG resource, wherein the CG resource comprises configuration information, and the configuration information comprises CG timer, CG retx Timer, and autonomous TX;

in a case of the CG resource being a deprioritized resource and the CG timer and the CG retx Timer being running, stopping the CG timer and stopping the CG retx Timer, wherein the deprioritized resource is not transmitted by the terminal in at least one of following cases:

the CG resource is conflicted with a CG resource;

the CG resource is conflicted with a Dynamic Grant (DG) resource;

the CG resource is conflicted with a Scheduling Request (SR) resource;

the DG resource is conflicted with the SR resource; and uplink grant is conflicted with a Physical Uplink Control Channel (PUCCH) resource;

wherein in response to the CG resource is a previous resource correpsonding to a Hybrid Automatic Repeat Request (HARQ) process and a Medium Access Control (MAC) Protocol Data Unit (PDU) is acquired, a subsequent CG resource corresponding to the HARQ process is used to perform automatic transmission.

8. The terminal device of claim 7, wherein the configuration information further comprises:

one or more HARQ process identifiers corresponding to the CG resource.

9. The terminal device of claim 7, wherein the terminal device is further caused to perform:

transmitting a prioritized resource in at least one of following cases:

the CG resource is conflicted with a CG resource;

the CG resource is conflicted with a Dynamic Grant (DG) resource;

the CG resource is conflicted with a Scheduling Request (SR) resource;

the DG resource is conflicted with the SR resource; and uplink grant is conflicted with a Physical Uplink Control Channel (PUCCH) resource.

10. The terminal device of claim 7, wherein the CG resource corresponds to a deprioritized MAC PDU.

11. The terminal device of claim 7, wherein Ultra-Reliable and Low Latency Communication (URLLC) automatic transmission is used.

12. The terminal device of claim 7, The method of claim 1, wherein the CG timer and the CG retx Timer are started at or after an end of a last symbol of a PUSCH resource when the PUSCH resource is a deprioritized resource.

13. A non-transitory computer-readable storage medium for storing a computer program, wherein when the computer program is run by a device, the device performs a method, applied to a New Radio Unlicensed (NRU) scenario, comprising:

receiving a CG resource, wherein the CG resource comprises configuration information, and the configuration information comprises CG timer, CG retx Timer, and autonomous TX;

in a case of the CG resource being a deprioritized resource and the CG timer and the CG retx Timer being running, stopping the CG timer and stopping the CG retx Timer, wherein the deprioritized resource is not transmitted by the terminal in at least one of following cases:

the CG resource is conflicted with a CG resource;

the CG resource is conflicted with a Dynamic Grant (DG) resource;

the CG resource is conflicted with a Scheduling Request (SR) resource;

the DG resource is conflicted with the SR resource; and uplink grant is conflicted with a Physical Uplink Control Channel (PUCCH) resource;

wherein in response to the CG resource is a previous resource correpsonding to a Hybrid Automatic Repeat Request (HARQ) process and a Medium Access Control (MAC) Protocol Data Unit (PDU) is acquired, a subsequent CG resource corresponding to the HARQ process is used to perform automatic transmission.

14. The non-transitory computer-readable storage medium of claim 13, wherein the configuration information further comprises:

one or more HARQ process identifiers corresponding to the CG resource.

15. The non-transitory computer-readable storage medium of claim 13, wherein the method further comprises:

transmitting, by the terminal device, a prioritized resource in at least one of following cases:

the CG resource is conflicted with a CG resource;

the CG resource is conflicted with a Dynamic Grant (DG) resource;

the CG resource is conflicted with a Scheduling Request (SR) resource;

the DG resource is conflicted with the SR resource; and uplink grant is conflicted with a Physical Uplink Control Channel (PUCCH) resource.

16. The non-transitory computer-readable storage medium of claim 13, wherein the CG resource corresponds to a deprioritized MAC PDU.

17. The non-transitory computer-readable storage medium of claim 13, wherein Ultra-Reliable and Low Latency Communication (URLLC) automatic transmission is used.

18. The non-transitory computer-readable storage medium of claim 13, wherein the CG timer and the CG retx Timer are started at or after an end of a last symbol of a PUSCH resource when the PUSCH resource is a deprioritized resource.

* * * * *